US012049683B2

(12) United States Patent
Shiflett et al.

(10) Patent No.: US 12,049,683 B2
(45) Date of Patent: Jul. 30, 2024

(54) METHODS FOR RECOVERING METALS FROM METAL-CONTAINING MATERIALS

(71) Applicant: University of Kansas, Lawrence, KS (US)

(72) Inventors: Mark Brandon Shiflett, Lawrence, KS (US); David Richard Corbin, West Chester, PA (US); Ankit Verma, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 617 days.

(21) Appl. No.: 17/287,258

(22) PCT Filed: Oct. 22, 2019

(86) PCT No.: PCT/US2019/057319
§ 371 (c)(1),
(2) Date: Apr. 21, 2021

(87) PCT Pub. No.: WO2020/086509
PCT Pub. Date: Apr. 30, 2020

(65) Prior Publication Data
US 2021/0395857 A1    Dec. 23, 2021

Related U.S. Application Data

(60) Provisional application No. 62/749,308, filed on Oct. 23, 2018.

(51) Int. Cl.
*C22B 7/00*     (2006.01)
*C22B 26/12*    (2006.01)
*H01M 10/54*    (2006.01)

(52) U.S. Cl.
CPC ............. *C22B 7/008* (2013.01); *C22B 7/007* (2013.01); *C22B 26/12* (2013.01); *H01M 10/54* (2013.01)

(58) Field of Classification Search
CPC ......... C22B 7/008; C22B 7/007; C22B 26/12; C22B 7/006; C22B 3/16; C22B 3/42; B09B 3/80; B09B 5/00
See application file for complete search history.

(56) References Cited

U.S. PATENT DOCUMENTS 2,927,001 A    3/1960  McCullough
4,275,043 A    6/1981  Gnyra
(Continued)

FOREIGN PATENT DOCUMENTS

CN    101555030 A    10/2009
CN    103594754 A     2/2014
(Continued)

OTHER PUBLICATIONS

The International Search Report and Written Opinion issued on Jan. 22, 2020 for International Patent Application No. PCT/US19/57319; pp. 1-12.
Sohn et al., "Comparison of two acidic leaching processes for selecting the effective recycle process of spent lithium ion battery," Geosystem Engineering 9.1 (Mar. 1, 2006): 1-6. Abstract, p. 3 col. 2 para 3; p. 4 col. 1 para 1-3; p. 4 para 1-8.
(Continued)

*Primary Examiner* — Brian D Walck
*Assistant Examiner* — Nazmun Nahar Shams
(74) *Attorney, Agent, or Firm* — Bell & Manning, LLC

(57) ABSTRACT

Methods for recovering metals from metal-containing materials are provided. The metal-containing material comprises either Co and Li (e.g., an electrode material from a spent lithium ion battery) or Fe and Al (e.g., bauxite). The metal-containing material is exposed to a leaching solution comprising ammonium hydrogen oxalate, oxalic acid, or both, to provide a solid composed of either cobalt oxalate or iron oxalate, and a solution of either lithium oxalate or aluminum oxalate. The solid is processed to provide either cobalt oxide (Continued)

Abbreviations: 1. DAO – Diammonium oxalate; 2. AHO – Ammonium hydrogen oxalate or iron oxide; the solution is processed to provide either a lithium precipitate or an aluminum precipitate, and a filtrate comprising an oxalate; and the filtrate comprising the oxalate is processed to recover ammonium hydrogen oxalate, oxalic acid, or both. The method further comprises repeating the digestion step with the recovered ammonium hydrogen oxalate, the recovered oxalic acid, or both.

17 Claims, 8 Drawing Sheets

(56) References Cited

U.S. PATENT DOCUMENTS

| | | |
|---|---|---|
| 8,137,647 B2 | 3/2012 | Corbin et al. |
| 8,709,279 B2 | 4/2014 | Belharouak et al. |
| 2008/0050295 A1 | 2/2008 | Uchida et al. |
| 2009/0028772 A1 | 1/2009 | Nakaoka et al. |
| 2010/0034714 A1 | 2/2010 | Corbin |
| 2012/0156497 A1 | 6/2012 | Boiko et al. |
| 2012/0280171 A1 | 11/2012 | Belharouak et al. |
| 2013/0292257 A1 | 11/2013 | Kaczur |
| 2014/0206894 A1 | 7/2014 | Cole et al. |
| 2022/0349025 A1 | 11/2022 | Shiflett et al. |

FOREIGN PATENT DOCUMENTS

| | | |
|---|---|---|
| CN | 106129511 A | 11/2016 |
| CN | 108767354 A | 11/2018 |
| EP | 3 260 560 B1 | 10/2019 |

OTHER PUBLICATIONS

Zeng et al., "Novel approach to recover cobalt and lithium from spent lithium-ion battery using oxalic acid," *Journal of hazardous materials* 295 (Sep. 15, 2015): 112-118. Abstract, p. 112 col. 2 para 2: p. 114 col. 2 para 2-p. 115 col. 1 para 1; and p. 115 col. 2 para 2.

Yang et al., "Recovery of iron from red mud by selective leach with oxalic acid," *Hydrometallurgy* 157 (Oct. 1, 2015): 239-245. Abstract, p. 239 col. 1 para 1; p. 240 col. 1 para 3-4; p. 240 col. 2 para 4; p. 244 col. 1 para 2; Figure 2; and Figure 5.

Kang et al., "Preparation of cobalt oxide from concentrated cathode material of spent lithium ion batteries by hydrometallurgical method," *Advanced Powder Technology* 21.2 (Mar. 1, 2010): 175-179. Entire Document.

Sun et al., "Organic oxalate as leachant and precipitant for the recovery of valuable metals from spent lithium-ion batteries," *Waste Management* 32.8 (Aug. 1, 2012): 1575-1582. Entire Document.

Abbreviations: OA – Oxalic Acid

*Abbreviations: 1. OA – Oxalic Acid; 2. AHO – Ammonium hydrogen oxalate; 3. DAO – Diammonium oxalate; 5. DAS – Diammonium sulfate*

US 12,049,683 B2

METHODS FOR RECOVERING METALS FROM METAL-CONTAINING MATERIALS

CROSS-REFERENCE TO RELATED APPLICATIONS

This application is a National Stage of International Application No. PCT/US19/57319, filed Oct. 22, 2019, which claims the benefit of U.S. Provisional Patent Application No. 62/749,308, filed Oct. 23, 2018, the contents of each of which are herein incorporated by reference.

BACKGROUND

Recovering metals from mixed-metal compounds and materials is an important consideration in many industries. For example, the lithium ion battery market is continuing to expand and with it, a growing concern over the limited supply of Co to support the continued growth of the industry. In order to supply enough Co, and possibly Li, an economically, environmentally friendly process is needed for recovering these metals from lithium ion battery materials. Similarly, bauxite is a rock with a relatively high aluminum content, providing a natural source of aluminum for many world markets. Bauxite consists mostly of the aluminum minerals gibbsite ($Al(OH)_3$), boehmite ($\gamma$-AlO(OH)) and diaspore ($\alpha$-AlO(OH)), mixed with the two iron oxides goethite (FeO(OH)) and haematite ($Fe_2O_3$), the aluminum clay mineral kaolinite ($Al_2Si_2O_5(OH)$) and small amounts of anatase ($TiO_2$) and ilmenite ($FeTiO_3$ or $FeO.TiO_2$). Processes for recovering aluminum from bauxite are also desirable.

SUMMARY

Provided are methods for recovering metals from metal-containing materials, for example, recovering Li and Co from lithium ion batteries and recovering Al and Fe from bauxite.

In the present methods, the metal-containing material comprises either Co and Li (e.g., an electrode material from a spent lithium ion battery) or Fe and Al (e.g., bauxite). The metal-containing material is exposed to a leaching solution comprising ammonium hydrogen oxalate, oxalic acid, or both, to provide a solid composed of either cobalt oxalate or iron oxalate, and a solution of either lithium oxalate or aluminum oxalate. The solid is processed to provide either cobalt oxide or iron oxide; the solution is processed to provide either a lithium precipitate or an aluminum precipitate, and a filtrate comprising an oxalate; and the filtrate comprising the oxalate is processed to recover ammonium hydrogen oxalate, oxalic acid, or both. The method further comprises repeating the digestion step with the recovered ammonium hydrogen oxalate, the recovered oxalic acid, or both.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are methods for recovering metals from metal-containing materials, for example, recovering Li and Co from lithium ion batteries and recovering Al and Fe from bauxite.

The present methods involve digestion of metal-containing materials, recovery of the individual metals from which the metal-containing materials are composed, and recycling of certain reagents used in the methods to achieve a closed loop process. The metal-containing material to be digested comprises at least two different metals, each of which is present as a distinct chemical compound or a mixed metal compound composed of both metals. Although the metal-containing material may comprise more than two different metals, in embodiments, it is desired to separate and recover two of the metals of the metal-containing material in particular. For example, in embodiments, the metal-containing material is an electrode material comprising Co and Li. The electrode material may comprise other metals in addition to Co and Li, but Co and Li are the metals which are desirably separated and recovered using the method. The Co and Li of the electrode material may be in the form of a lithiated chemical compound such as $LiCoO_2$ (i.e., a metal-containing compound composed of both metals). The electrode material may comprise additional components typically used in electrodes of lithium ion batteries, e.g., binders, fillers, etc. The electrode material may be derived from a spent lithium ion battery, i.e., a battery which has been used to provide power to an electrical load/circuit. In embodiments, the metal-containing-containing material is bauxite comprising Fe and Al. As noted above, the Fe of bauxite is generally present as various iron oxide compounds and the Al of bauxite is generally present as various aluminum mineral/clay compounds. Other metals may be present, but Fe and Al are the metals which are desirably separated and recovered using the method.

Figure 4:
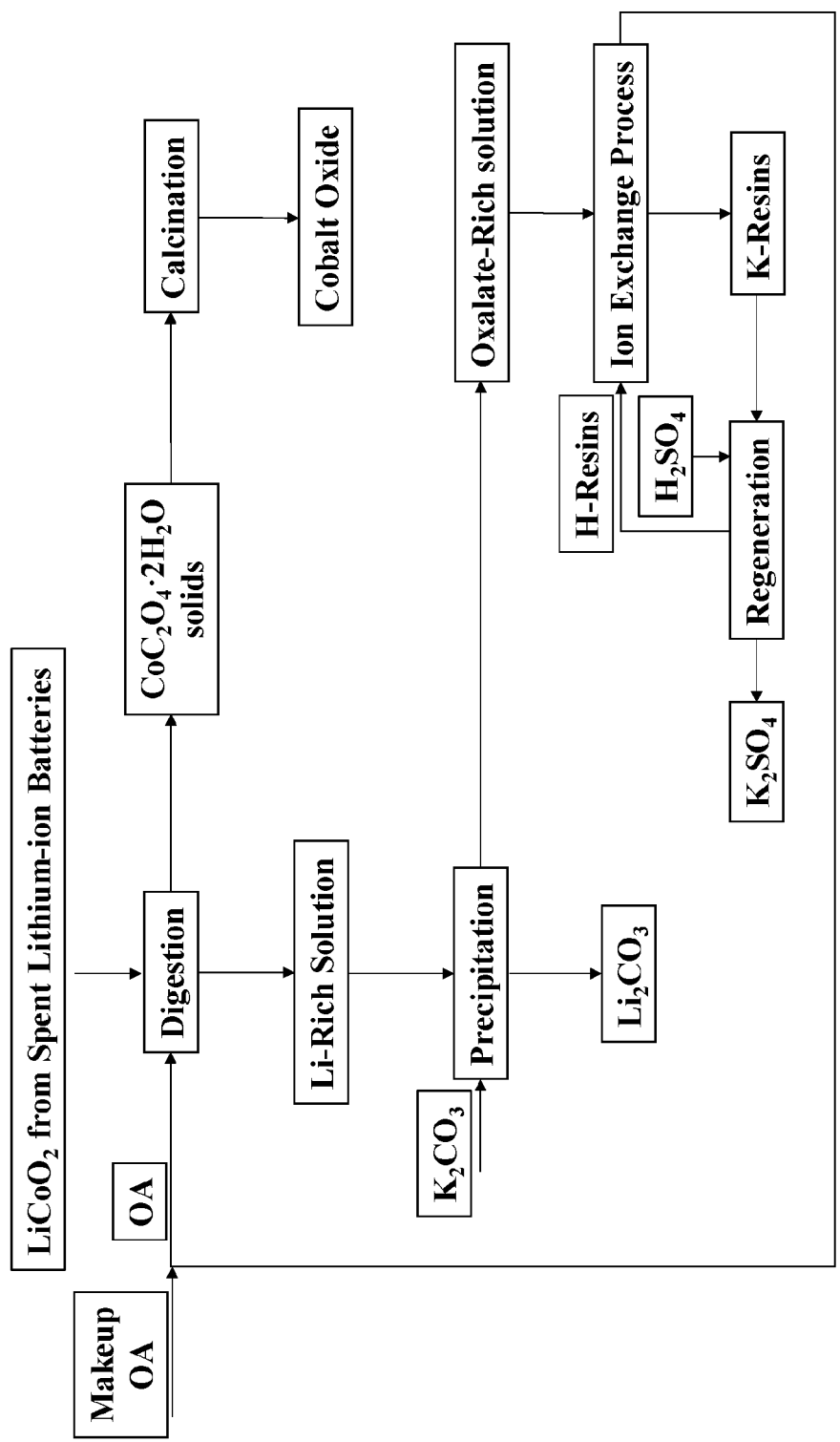
FIG. 4 depicts a flow chart illustrating a closed loop process for the recovery of Li and Co from spent lithium ion batteries using oxalic acid under inert conditions.
Figure 5:
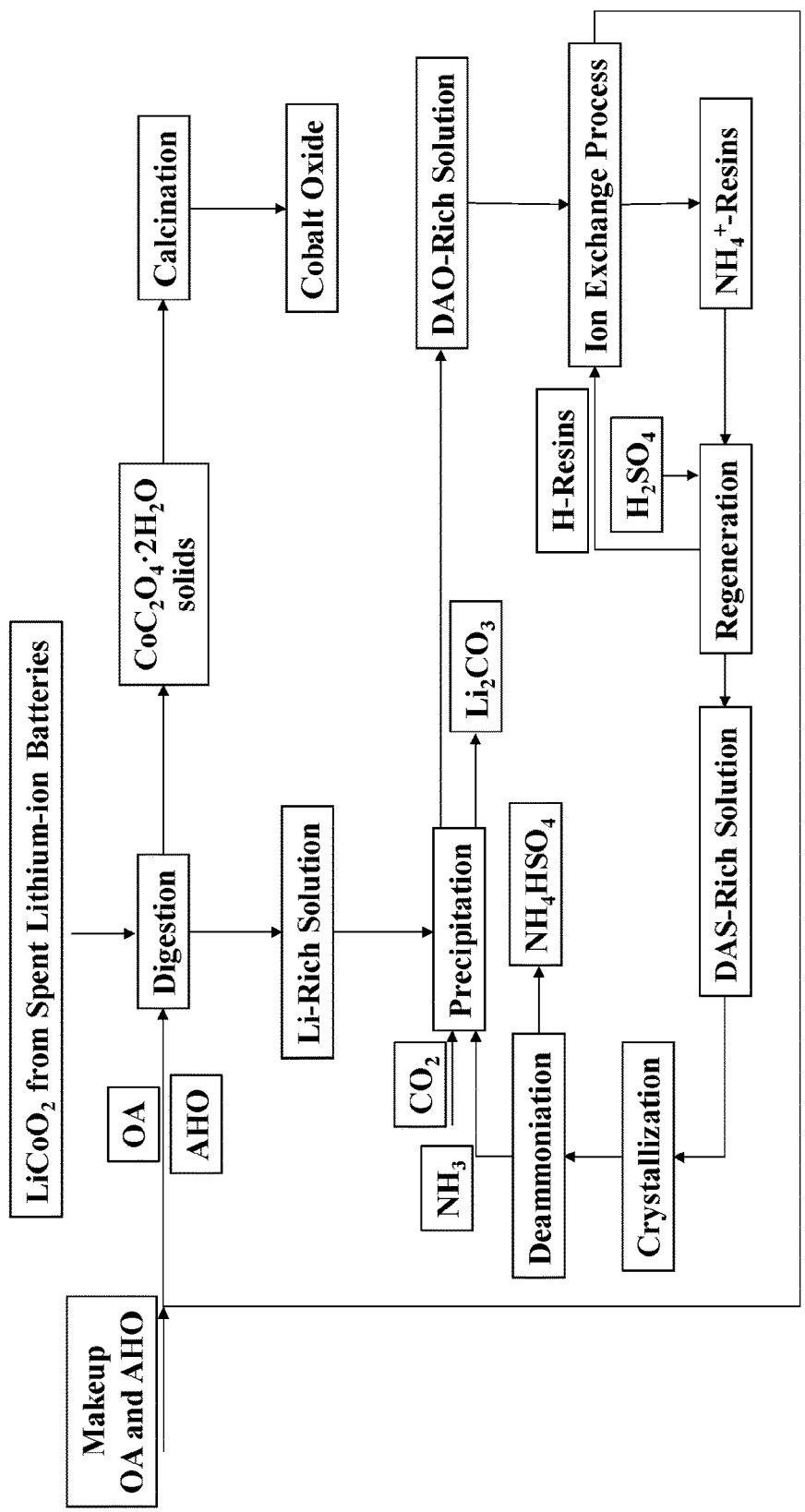
FIG. 5 depicts a flow chart illustrating a closed loop process for the recovery of Li and Co from spent lithium ion batteries using a combination of ammonium hydrogen oxalate and oxalic acid under inert conditions.
Figure 6:
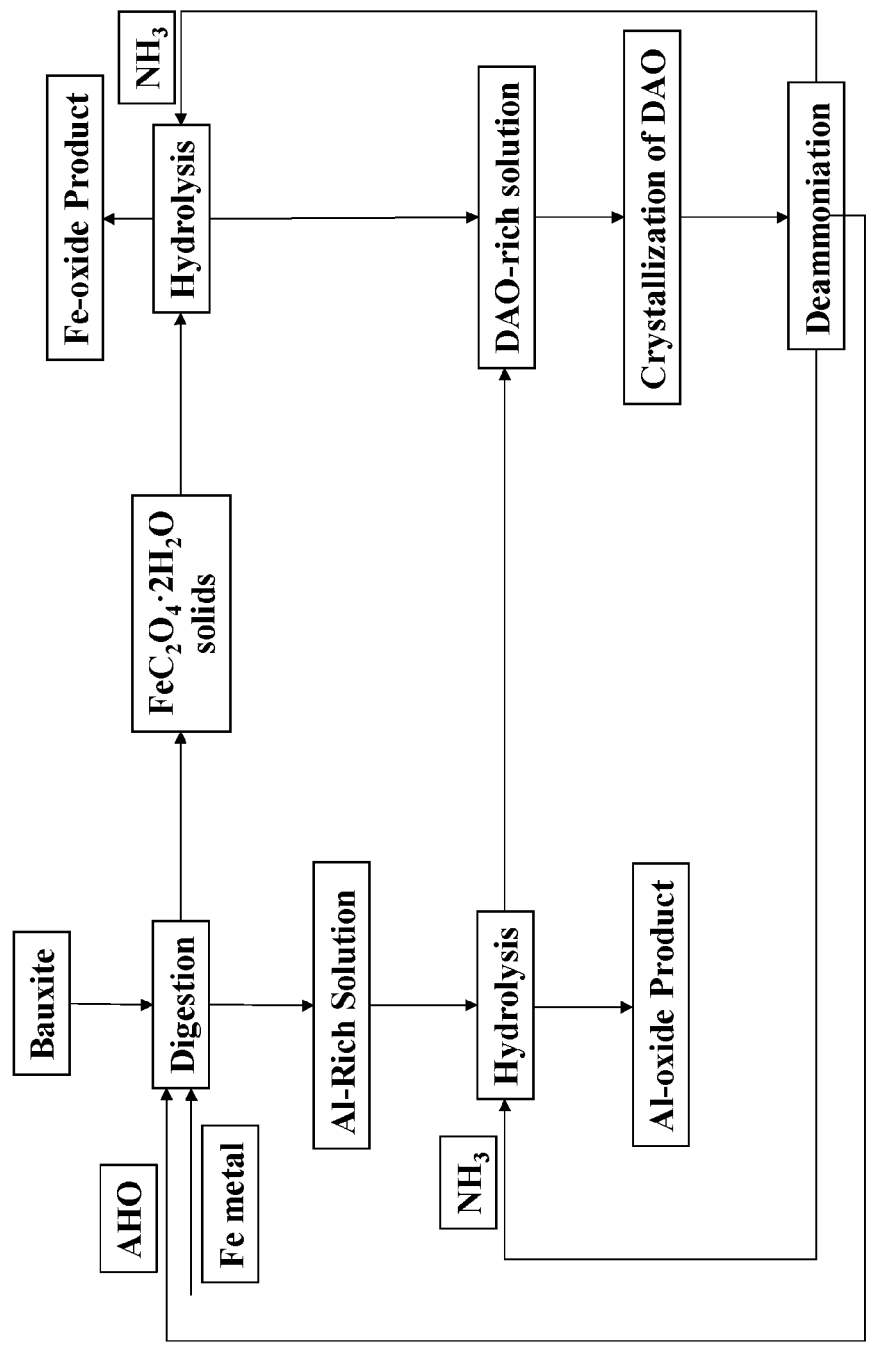
FIG. 6 depicts a flow chart illustrating a closed loop process for the recovery of Al and Fe from bauxite using ammonium hydrogen oxalate under reducing conditions.
Figure 7:
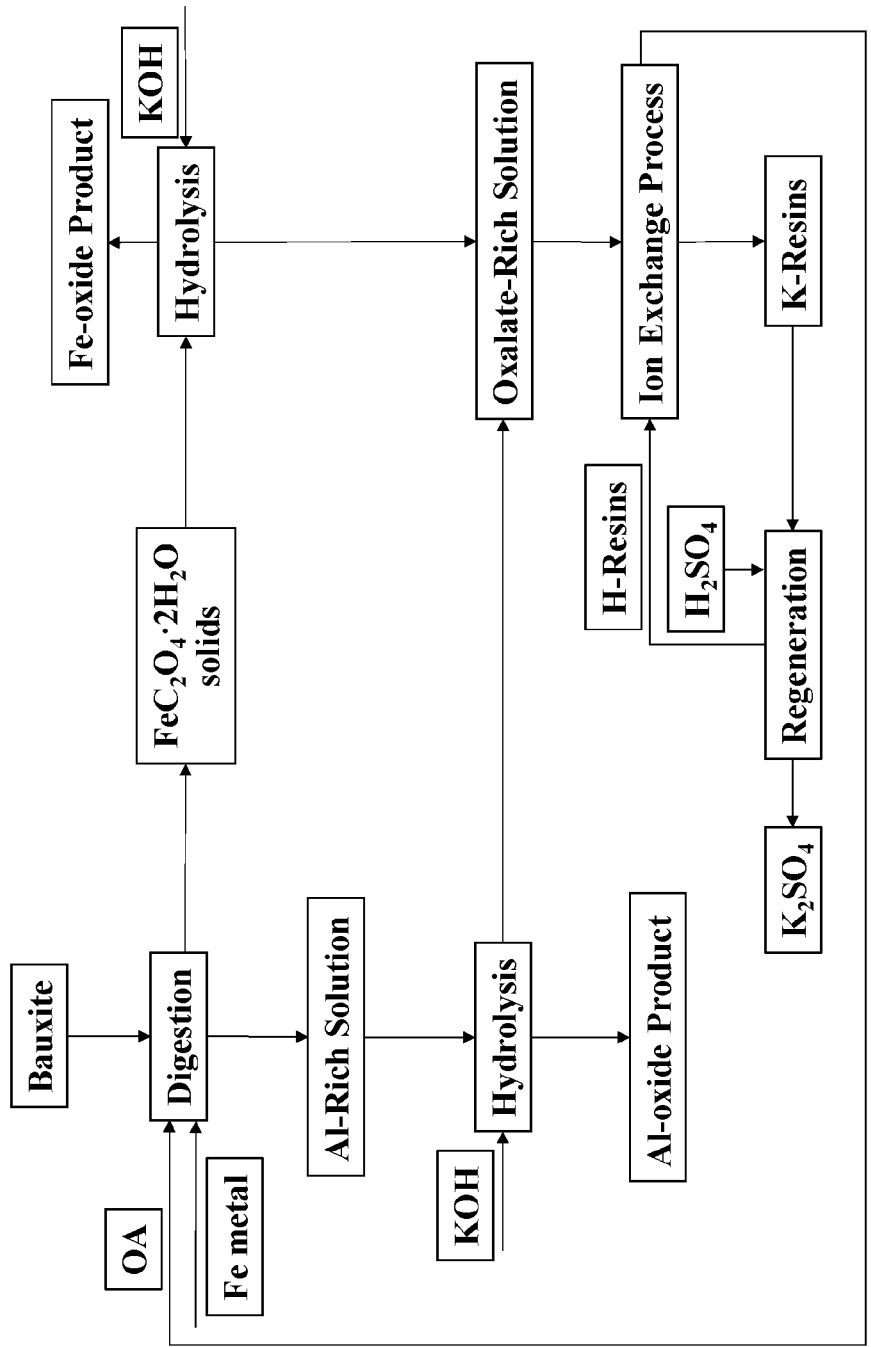
FIG. 7 depicts a flow chart illustrating a closed loop process for the recovery of Al and Fe from bauxite using oxalic acid under reducing conditions.
Figure 8:
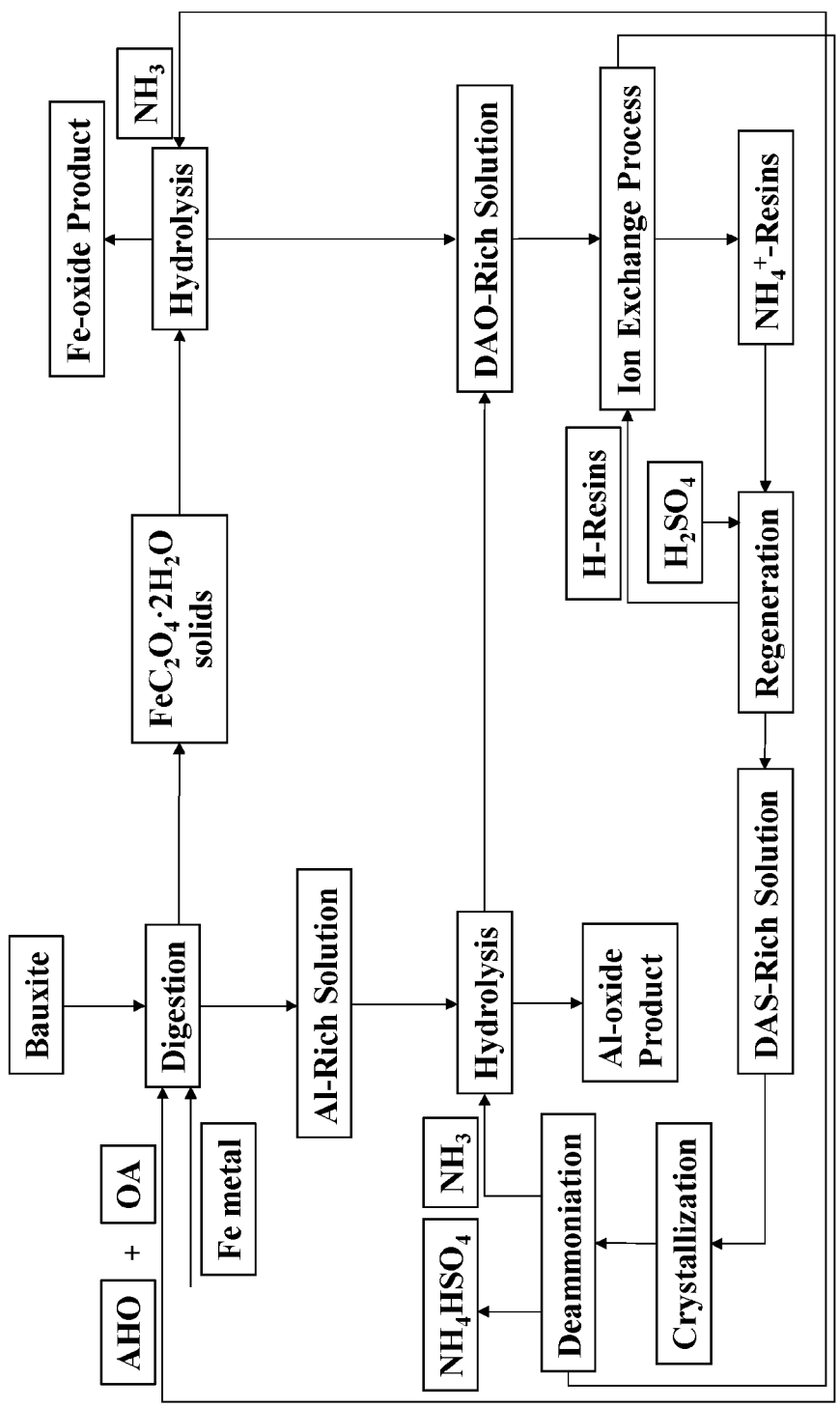
FIG. 8 depicts a flow chart illustrating a closed loop process for the recovery of Al and Fe from bauxite using a combination of ammonium hydrogen oxalate and oxalic acid under reducing conditions.

Illustrative embodiments of the present methods are depicted in FIGS. 1-8. FIGS. 1-5 illustrate various methods for recovering Li and Co from spent lithium ion batteries while FIGS. 6-8 illustrate various methods for recovering Fe and Al from bauxite. The steps of the methods will be described in more detail below, with reference to these figures. However, it is to be understood that the methods illustrated in FIGS. 1-8 are not intended to be limiting; each method may comprise additional, fewer, or different steps (including different combinations of steps). By way of illustration, the digestion steps shown in FIGS. 4 and 5 may be carried out under reductive or oxidative environments.

Regarding digestion, the methods comprise exposing the metal-containing material to a leaching solution under conditions to form a leachate from which the individual metals can be recovered. The leaching solution comprises ammonium hydrogen oxalate, oxalic acid, or both. The leaching solution further comprises a solvent, e.g., water. Ammonium hydrogen oxalate may be formed from an aqueous solution of oxalic acid and diammonium oxalate (under the conditions of digestion, oxalic acid and diammonium oxalate (ammonium oxalate monohydrate) react to form ammonium hydrogen oxalate). The leaching solution digests the metal-containing material to provide the leachate. Digestion involves chemically converting the metal compound(s) of the metal-containing material into other metal compounds; the leachate comprises these other metal compounds. In the present disclosure, the term "leachate" refers both to the liquid resulting from digestion as well as solids which may be suspended within or may have precipitated out of that liquid.

In embodiments, the leaching solution comprises ammonium hydrogen oxalate but is substantially free from oxalic acid. In embodiments, the leaching solution comprises oxalic acid but is substantially free of ammonium hydrogen oxalate. By "substantially free" it is meant that the amount of the ammonium hydrogen oxalate or oxalic acid, which is dependent on pH, has no effect or a minimal effect on the digestion. In embodiments, the leaching solution consists essentially of, or consists of water, ammonium hydrogen oxalate, and optionally, a reducing agent or an oxidizing agent. In embodiments, the leaching solution consists essentially of, or consists of, water, oxalic acid, and optionally, a reducing agent or an oxidizing agent. In embodiments, the leaching solution consists essentially of, or consists of, water, ammonium hydrogen oxalate, oxalic acid, and optionally, a reducing agent or an oxidizing agent.

The exact chemical composition and form of the leachate can depend upon the conditions used for the digestion. For example, as shown in FIGS. 1, 2, 4, 5-8, the leachate comprises a metal-containing compound suspended within or precipitated out of solution (solid portion of the leachate) and a metal-containing solution (liquid portion of the leachate). The solid portion of the leachate generally comprises more of one of the metals of the metal-containing material as compared to another of the metals of the metal-containing material, while the liquid portion of the leachate generally comprises more of the other of the metals of the metal-containing material. The solid portion may be separated from the liquid portion, e.g., via filtration, and each portion separately processed to recover the individual metals. This recovery is described in more detail below.

Figure 1:
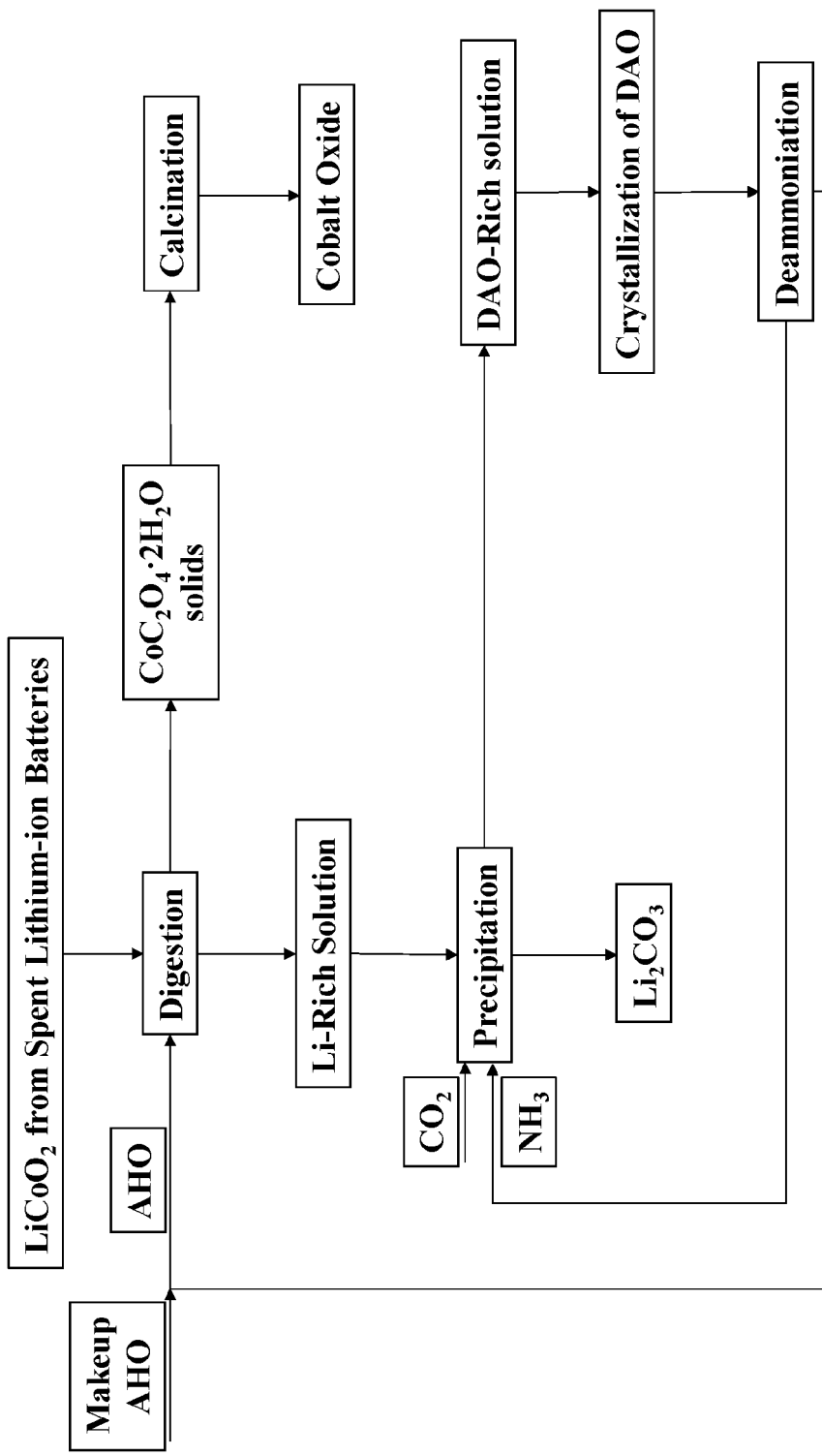
FIG. 1 depicts a flow chart illustrating a closed loop process for the recovery of Li and Co from spent lithium ion batteries using ammonium hydrogen oxalate under inert conditions.
Figure 2:
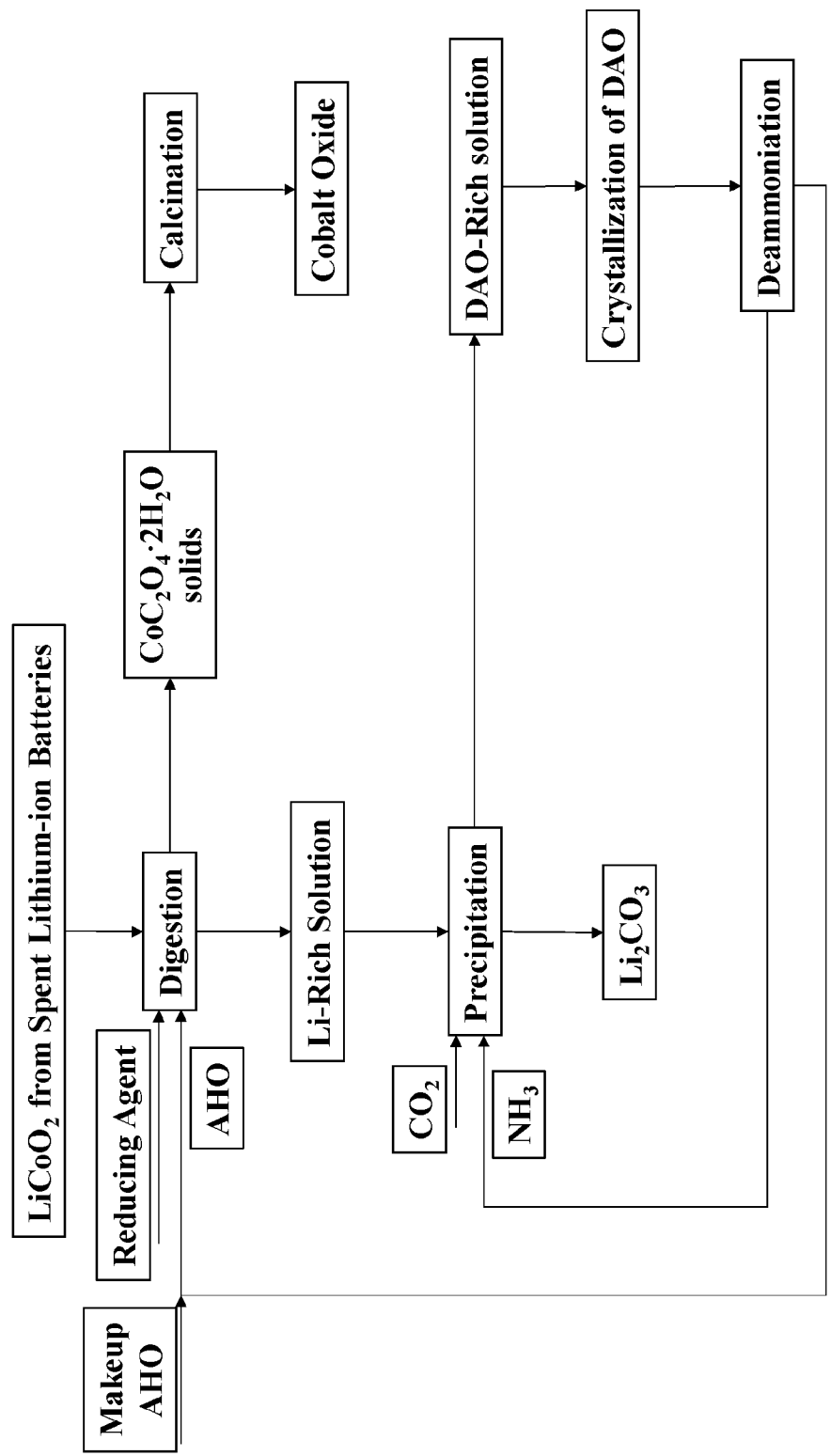
FIG. 2 depicts a flow chart illustrating a closed loop process for the recovery of Li and Co from spent lithium ion batteries using ammonium hydrogen oxalate under reducing conditions.
Figure 3:
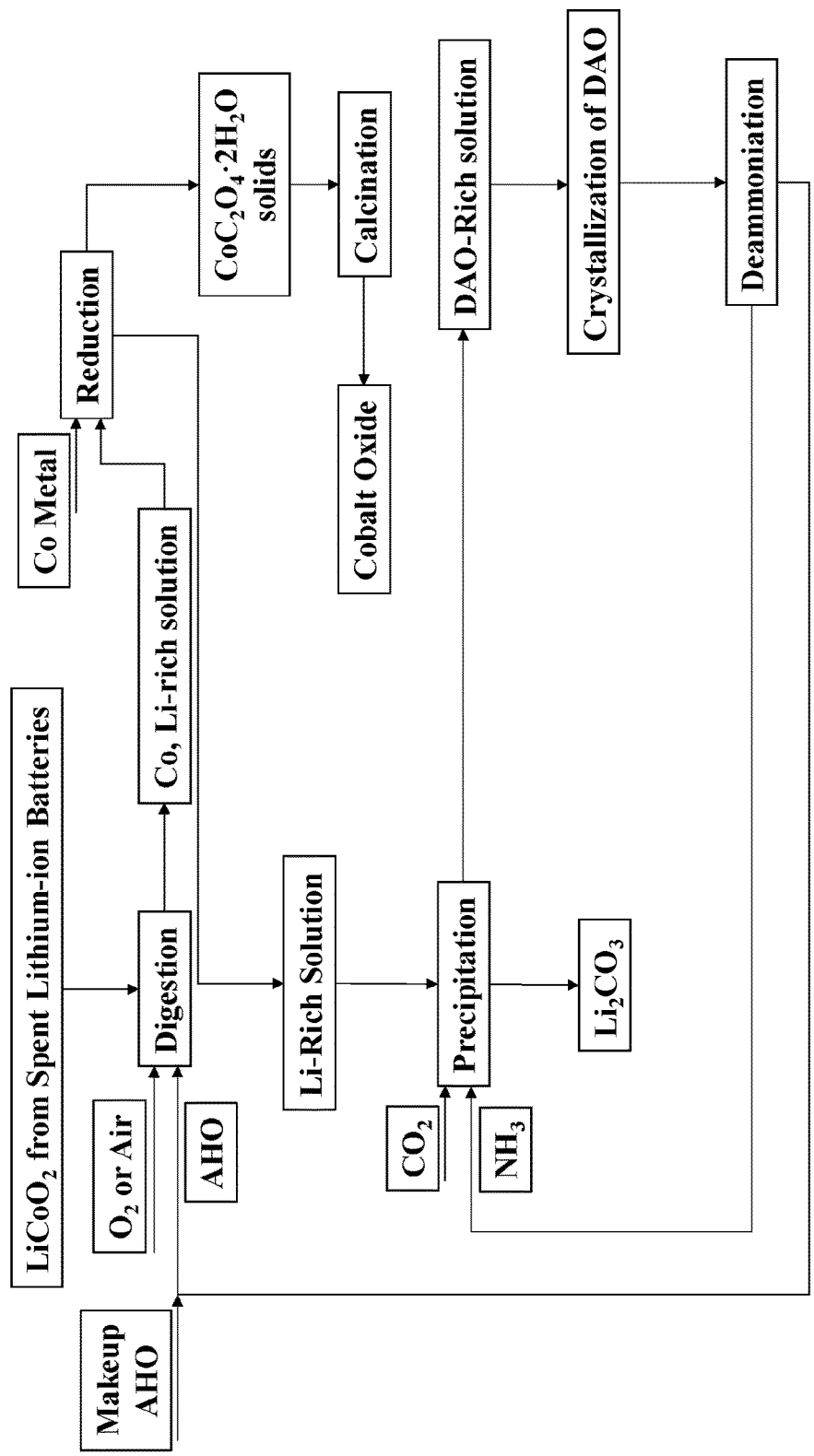
FIG. 3 depicts a flow chart illustrating a closed loop process for the recovery of Li and Co from spent lithium ion batteries using ammonium hydrogen oxalate under oxidizing conditions.

Turning back to FIGS. 1, 2, 4, and 5, the leachate may comprise a solid Co-containing compound (e.g., cobalt oxalate ($CoC_2O_4 \cdot 2H_2O$)) and a Li-containing solution (e.g., solution comprising lithium oxalate ($Li_2C_2O_4$)). Similarly, in FIGS. 6-8, the leachate may comprise a solid Fe-containing compound, e.g., iron oxalate ($FeC_2O_4 \cdot 2H_2O$), and an Al-containing solution (e.g., solution comprising aluminum oxalate (such as $Al(C_2O_4)_3^{3-}$)). However, as shown in FIG. 3, under oxidative digestion conditions, the leachate is a Co/Li-containing solution which may undergo further processing to provide the solid Co-containing compound and the Li-containing solution. Such processing may comprise use of a reducing agent such as an appropriate metal, e.g., Co metal, to provide the solid Co-containing compound the Li-containing solution.

In addition to selection of the leaching solution (i.e., whether ammonium hydrogen oxalate, oxalic acid, or both, is used), the conditions under which digestion is carried out refer to the amount of the ammonium hydrogen oxalate/oxalic acid; the environment (whether inert, reductive, or oxidative); the temperature; and the time. In general, these conditions may be adjusted to provide a desired (e.g., maximum) yield of one, both, or all of the leached metal-containing compounds. For example, yield may be based on the amount of solids obtained as compared to the starting amount of the metal-containing material, e.g., amount of $CoC_2O_4 \cdot 2H_2O$ obtained as compared to the starting amount of $LiCoO_2$. Illustrative conditions are provided in the Examples below. For embodiments in which the leaching solution comprises both ammonium hydrogen oxalate and oxalic acid, the relative amounts of these components may be adjusted as described above. For example, the relative amount of oxalic acid to ammonium hydrogen oxalate may range from 10 weight %:90 weight % to 90 weight %:10 weight %. Here, weight % means (weight of either oxalic acid or ammonium hydrogen oxalate)/(total weight of oxalic acid and ammonium hydrogen oxalate)*100. In embodiments, the relative amount may range from 25 weight %:75 weight % to 75 weight %:25 weight %.

Regarding environment, this refers to digestion being carried out under either inert conditions, reductive conditions, or oxidative conditions. (See FIGS. 1, 4, 5 (inert), FIGS. 2, 6-8 (reductive), and FIG. 3 (oxidative)). Inert conditions may be achieved by using an atmosphere of an inert gas. Reductive conditions may be achieved by using a reducing agent, e.g., including the reducing agent in the leaching solution. In embodiments, the reducing agent is $H_2O_2$. As demonstrated in Examples 3A-3D, $H_2O_2$ increased the yield of solid $CoC_2O_4 \cdot 2H_2O$ from $LiCoO_2$. It is unexpected that $H_2O_2$ worked to facilitate reduction instead of the oxidation of Co. The amount of the reducing agent may be adjusted to tune the yield. In other embodiments, the reducing agent is a metal, e.g., Co metal. Oxidative conditions may be achieved by using an oxidative atmosphere, e.g., air or $O_2$.

As noted above, the present methods further involve recovery of the individual metals of the metal-containing materials from the leachate; specifically, recovery from the solid metal-containing compound and from the metal-containing solution (whether these are obtained indirectly from the leachate as in FIG. 3 or directly from the leachate as in the remaining figures.) The individual metals are generally recovered as other metal-containing compounds, e.g., metal oxides, metal carbonates, metal phosphates, etc., as opposed to metal oxalates. The details of the recovery process may vary and can depend upon the metal-containing material as well as the conditions used in an earlier step of the method.

For example, as shown in FIGS. 1-5, recovery of Li may comprise exposing the Li-containing solution to conditions sufficient to form a Li-containing precipitate. As shown in FIGS. 1-3 and 5, these conditions may comprise exposing the Li-containing solution to $CO_2$, which will form carbonic acid ($H_2CO_3$) with the water of the Li-containing solution. A base (e.g., ammonia) may be added to increase the pH to facilitate precipitation. As shown in FIG. 4, these conditions may comprise adding a salt to the Li-containing solution.

Non-oxalate salts such as a phosphate salt or a carbonate salt may be used. As demonstrated in Examples 5E-5G, potassium salts, e.g., $K_2CO_3$, are particularly useful. The amount of $CO_2$, pH, type of salt, amount of salt, temperature and time may be adjusted to provide desired, e.g., maximum, yield of precipitate. Illustrative conditions are further described in the Examples, below. The Li-containing precipitate may be recovered, e.g., by filtration. The filtrate, the chemical composition of which can depend upon the conditions used in earlier steps of the method, may be further processed in a recycling step as will be described below. As also shown in FIGS. 1-5, recovery of Co may comprise calcination in air or $O_2$ to convert the Co-containing solid to cobalt oxide. The temperature and time may be adjusted to provide a desired, e.g., maximum, conversion and thus, yield of cobalt oxide.

As another example, as shown in FIGS. 6-8, recovery of Al may comprise adding a base to the Al-containing solution under conditions to induce hydrolysis and form an aluminum oxide product (precipitate) which may be recovered, e.g., by filtration. In embodiments, a base comprising potassium is used, e.g., KOH. The type of base, amount of base, temperature and time may be adjusted to provide desired, e.g., maximum, yield of product. The filtrate from this hydrolysis may be further processed in a recycling step as further described below. Similarly, as also shown in FIGS. 6-8, recovery of Fe may comprise exposing the Fe-containing solids to a base (e.g., KOH) under conditions to induce hydrolysis and form an iron oxide product which may be recovered, e.g., by filtration. The type of base, amount of base, temperature and time may be adjusted to provide desired, e.g., maximum, yield of product. The filtrate from this hydrolysis may be combined with the filtrate from the hydrolysis for recovering Al and also further processed in a recycling step.

As noted above, the present methods further involve recycling of certain reagents used in the methods in order to form a closed loop process, which minimizes external inputs to the method. Specifically, the reagents for forming the various leaching solutions, i.e., ammonium hydrogen oxalate and oxalic acid may be recovered and fed back into the digestion step. Similarly, other reagents, such as $NH_3$, may be recovered and fed back into hydrolysis/precipitation steps. As such, the term "recovered" is used with respect to these specific reagents when identifying them as having been recovered from a previous step of the method. Of course, reagents may also be added to the methods as needed. For example, additional amounts of ammonium hydrogen oxalate, oxalic acid, or both may be added to the methods as needed; such additional amounts are labeled with the term "make-up" in FIGS. 1-5.

Recycling involves processing the filtrate(s) generated in the recovery step(s). As noted above, the type of filtrate can depend upon the conditions used in an earlier step of the method. As shown in FIGS. 1-3 and 6, the filtrate may be a solution comprising diammonium oxalate (i.e., "DAO-rich solution"). Diammonium oxalate may be crystallized from this solution. Next, crystallized diammonium oxalate may be subjected to deammoniation to recover both ammonium hydrogen oxalate and ammonia, which may be fed back into the relevant steps. As shown in FIGS. 4 and 7, the filtrate may be a solution comprising a different oxalate salt, e.g., potassium oxalate. In such cases, the filtrate may be exposed to an ion exchange resin ("H-resins") configured to exchange cations of the oxalate salt (e.g., potassium ions) for hydrogen ions to provide oxalic acid which may be fed back into a digestion step. (See, e.g., Example 6E.) The used ion exchange resin ("K-resins") may be regenerated by exposure to an acid, e.g., $H_2SO_4$. (See, e.g., Examples 6H and 6I).

FIGS. 5 and 8 show another recycling step which may be used for filtrates comprising diammonium oxalate. The filtrate may be exposed to an ion exchange resin ("H-resins") configured to exchange ammonium ions for hydrogen ions. This exchange provides oxalic acid as well as some ammonium hydrogen oxalate which may be fed back into a digestion step. (See, e.g., Example 7B.) The used ion exchange resin ("NW-resins") may be regenerated by exposure to an acid, e.g., $H_2SO_4$, and the resulting diammonium sulfate solution ("DAS-rich solution") may be subjected to crystallization and deammoniation to recover ammonia. (See, e.g., Examples 7C, 7E.)

As illustrated in FIGS. 1-8, the present methods may further comprise repeating the initial digestion step of exposing the metal-containing material (e.g., a new batch of electrode material from a spent lithium ion battery or a new batch of bauxite) to recovered ammonium hydrogen oxalate, recovered oxalic acid, or both. Any ammonia used in subsequent steps of the method may also be recovered ammonia as described above. These illustrative closed loop processes are more efficient and cost-effective than conventional Co/Li or Fe/Al recovery methods.

EXAMPLES

Digestion of Lithium Cobalt Oxide Using Ammonium Hydrogen Oxalate

Example 1A: Digestion Experiment at 1:4 Ratio of Co to Oxalate

In a 1000 ml Ace glass reactor flask were charged 6 g $LiCoO_2$ (Sigma Aldrich, Catalog Number 442704, CAS Number [12190-79-3]), 15.45 g $H_2C_2O_4 \cdot 2H_2O$ (Sigma Aldrich reagent grade oxalic acid dihydrate, Catalog Number 247537, CAS Number [6153-56-6]), 17.42 g $(NH_4)_2C_2O_4 \cdot H_2O$ (Acros Organics ammonium oxalate monohydrate, Catalog Number AC206270010, CAS Number [6009-70-7]) and 800 g deionized water. The Co to oxalate ratio of this mixture was 1:4 and the concentration of oxalate in aqueous solution was 0.3 M. The flask was connected to a Duran® style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and ammonium oxalate monohydrate react to form ammonium hydrogen oxalate. After cooling down, reactor was disassembled, and filtration was performed using a 11 μm cellulose filter. During filtration, residue was washed with deionized water. Later, residue was kept for drying overnight and obtained a total mass of 7.50 g. PXRD of solids recovered matches exactly to commercial cobalt oxalate dihydrate (Sigma Aldrich, Catalog Number 401285, CAS Number [5965-38-8]).

Example 1B: Digestion Experiment at 1:4 Ratio of Co to Oxalate Under Dark Condition In a 1000 ml Ace glass reactor flask were charged 6 g $LiCoO_2$ (Sigma Aldrich, Catalog Number 442704, CAS Number [12190-79-3]), 15.45 g $H_2C_2O_4 \cdot 2H_2O$ (Sigma Aldrich reagent grade oxalic acid dihydrate, Catalog Number 247537, CAS Number [6153-56-6]), 17.42 g $(NH_4)_2C_2O_4 \cdot H_2O$ (Acros Organics ammonium oxalate monohydrate, Catalog Number AC206270010, CAS Number [6009-

70-7]) and 800 g deionized water. The Co to oxalate ratio of this mixture was 1:4 and the concentration of oxalate in aqueous solution was 0.3 M. The flask was connected to a Duran® style head with a stirring rod and temperature controllers enclosed in a heating jacket. The entire reactor was wrapped with thick aluminum foil to not allow any light to enter. The reactor was stirred at 600 rpm and heated from 20° C. to 98° C. and held at the temperature for 8 h before allowing to cool. In these conditions, oxalic acid and ammonium oxalate monohydrate react to form ammonium hydrogen oxalate. After cooling down, reactor was disassembled, and filtration was performed using a 11 μm cellulose filter. During filtration, residue was washed with deionized water. Later, residue was kept for drying overnight and obtained a total mass of 7.02 g. PXRD of solids recovered matches exactly to commercial cobalt oxalate dihydrate (Sigma Aldrich, Catalog Number 401285, CAS Number [5965-38-8]).

Example 1C: Digestion Experiment at 1:6 Ratio of Co to Oxalate

In a 1000 ml Ace glass reactor flask were charged 6 g LiCoO$_2$ (Sigma Aldrich, Catalog Number 442704, CAS Number [12190-79-3]), 23.19 g H$_2$C$_2$O$_4$·2H$_2$O (Sigma Aldrich reagent grade oxalic acid dihydrate, Catalog Number 247537, CAS Number [6153-56-6]), 26.14 g (NH$_4$)$_2$C$_2$O$_4$·H$_2$O (Acros Organics ammonium oxalate monohydrate, Catalog Number AC206270010, CAS Number [6009-70-7]) and 800 g deionized water. The Co to oxalate ratio of this mixture was 1:6 and the concentration of oxalate in aqueous solution was 0.45 M. The flask was connected to a Duran® style head with a stirring rod and temperature controllers enclosed in a heating jacket. The reactor was stirred at 600 rpm and heated from 20° C. to 98° C. and held at the temperature for 24 h before allowing to cool. In these conditions, oxalic acid and ammonium oxalate monohydrate react to form ammonium hydrogen oxalate. Reactor was disassembled while being at 80° C., and hot filtration was performed. 200 g water along with the filtration equipment were heated to 80° C. and from 11 μm cellulose filter slurry contents were passed. Using the hot water, solids were washed to produce a total combined residue mass of 3.70 g. PXRD of solids recovered matches exactly to commercial cobalt oxalate dihydrate (Sigma Aldrich, Catalog Number 401285, CAS Number [5965-38-8]).

Example 1D: Digestion Experiment at 1:8 Ratio of Co to Oxalate

In a 1000 ml Ace glass reactor flask were charged 6 g LiCoO$_2$ (Sigma Aldrich, Catalog Number 442704, CAS Number [12190-79-3]), 30.91 g H$_2$C$_2$O$_4$·2H$_2$O (Sigma Aldrich reagent grade oxalic acid dihydrate, Catalog Number 247537, CAS Number [6153-56-6]), 34.85 g (NH$_4$)$_2$C$_2$O$_4$·H$_2$O (Acros Organics ammonium oxalate monohydrate, Catalog Number AC206270010, CAS Number [6009-70-7]) and 800 g deionized water. The Co to oxalate ratio of this mixture was 1:8 and the concentration of oxalate in aqueous solution was 0.61 M. The flask was connected to a Duran® style head with a stirring rod and temperature controllers enclosed in a heating jacket. The reactor was stirred at 600 rpm and heated from 20° C. to 98° C. and held at the temperature for 24 h before allowing to cool. In these conditions, oxalic acid and ammonium oxalate monohydrate react to form ammonium hydrogen oxalate. Reactor was disassembled while being at 80° C., and hot filtration was performed. 200 g water along with the filtration equipment were heated to 80° C. and from 11 μm cellulose filter slurry contents were passed. Using the hot water, solids were washed to produce a total combined residue mass of 6.42 g. PXRD of solids recovered matches exactly to commercial cobalt oxalate dihydrate (Sigma Aldrich, Catalog Number 401285, CAS Number [5965-38-8]).

Digestion of Lithium Cobalt Oxide Using Oxalic Acid

Example 2A: Digestion Experiment at 1:4 Ratio of Co to Oxalate

In a 1000 ml Ace glass reactor flask were charged 6.08 g LiCoO$_2$ (Sigma Aldrich, Catalog Number 442704, CAS Number [12190-79-3]), 30.96 g H$_2$C$_2$O$_4$·2H$_2$O (Sigma Aldrich reagent grade oxalic acid dihydrate, Catalog Number 247537, CAS Number [6153-56-6]) and 800.12 g deionized water. The Co to oxalate ratio of this mixture was 1:4 and the concentration of oxalate in aqueous solution was 0.3 M. The flask was connected to a Duran® style head with a stirring rod and temperature controllers enclosed in a heating jacket. The reactor was stirred at 600 rpm and heated from 20° C. to 98° C. and held at the temperature for 8 h before allowing to cool. After cooling down, reactor was disassembled, and filtration was performed using a 11 μm cellulose filter. During filtration, residue was washed with deionized water. Later, residue was kept for drying overnight and obtained a total mass of 9.58 g. PXRD of solids recovered matches exactly to commercial cobalt oxalate dihydrate (Sigma Aldrich, Catalog Number 401285, CAS Number [5965-38-8]).

Example 2B: Digestion Experiment at 1:3 Ratio of Co to Oxalate

In a 1000 ml Ace glass reactor flask were charged 6 g LiCoO$_2$ (Sigma Aldrich, Catalog Number 442704, CAS Number [12190-79-3]), 23.32 g H$_2$C$_2$O$_4$·2H$_2$O (Sigma Aldrich reagent grade oxalic acid dihydrate, Catalog Number 247537, CAS Number [6153-56-6]) and 800.03 g deionized water. The Co to oxalate ratio of this mixture was 1:3 and the concentration of oxalate in aqueous solution was 0.23 M. The flask was connected to a Duran® style head with a stirring rod and temperature controllers enclosed in a heating jacket. The reactor was stirred at 600 rpm and heated from 20° C. to 98° C. and held at the temperature for 7.5 h before allowing to cool. After cooling down, reactor was disassembled, and filtration was performed using a 11 μm cellulose filter. During filtration, residue was washed with deionized water. Later, residue was kept for drying overnight and obtained a total mass of 9.60 g. PXRD of solids recovered matches exactly to commercial cobalt oxalate dihydrate (Sigma Aldrich, Catalog Number 401285, CAS Number [5965-38-8]).

Example 2C: Digestion Experiment Using the Filtrate of Experiment 2A

In a 1000 ml Ace glass reactor flask were charged 6 g LiCoO$_2$ (Sigma Aldrich, Catalog Number 442704, CAS Number [12190-79-3]) and 794.38 g of the filtrate from experiment 2A. The flask was connected to a Duran® style head with a stirring rod and temperature controllers enclosed in a heating jacket. The reactor was stirred at 600 rpm and heated from 20° C. to 98° C. and held at the temperature for 7 h. Immediately reactor was disassembled, and filtration was performed using a 11 μm cellulose filter. During filtration, residue was washed with deionized water. Later, residue was kept for drying overnight and obtained a total mass of 8.03 g. PXRD of solids recovered matches exactly to commercial cobalt oxalate dihydrate (Sigma Aldrich, Catalog Number 401285, CAS Number [5965-38-8]).

Example 2D: Digestion Experiment at 1:1.5 Ratio of Co to Oxalate

In a 1000 ml Ace glass reactor flask were charged 6 g $LiCoO_2$ (Sigma Aldrich, Catalog Number 442704, CAS Number [12190-79-3]), 11.60 g $H_2C_2O_4 \cdot 2H_2O$ (Sigma Aldrich reagent grade oxalic acid dihydrate, Catalog Number 247537, CAS Number [6153-56-6]) and 799.93 g deionized water. The Co to oxalate ratio of this mixture was 1:1.5 and the concentration of oxalate in aqueous solution was 0.115 M. The flask was connected to a Duran® style head with a stirring rod and temperature controllers enclosed in a heating jacket. The reactor was stirred at 600 rpm and heated from 20° C. to 98° C. and held at the temperature for 6.5 h. After 6.5 h, immediately reactor was disassembled, and filtration was performed using an 11 μm cellulose filter. During filtration, residue was washed with deionized water. Later, residue was kept for drying overnight and obtained a total mass of 8.05 g. PXRD of solids recovered indicated it to be a mixture of cobalt oxalate dihydrate and lithium cobalt oxide

Example 2E: Digestion Experiment at 1:4 Ratio of Co to Oxalate

In a 1000 ml Ace glass reactor flask were charged 12.52 g $LiCoO_2$ (Sigma Aldrich, Catalog Number 442704, CAS Number [12190-79-3]), 64.5 g $H_2C_2O_4 \cdot 2H_2O$ (Sigma Aldrich reagent grade oxalic acid dihydrate, Catalog Number 247537, CAS Number [6153-56-6]) and 834 g deionized water. The Co to oxalate ratio of this mixture was 1:4 and the concentration of oxalate in aqueous solution was 0.61 M. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 22.82 g. PXRD of solids matches exactly to commercial cobalt oxalate dihydrate (Sigma Aldrich, Catalog Number 401285, CAS Number [5965-38-8]).

Digestion of Lithium Cobalt Oxide Using Oxalic Acid and Hydrogen Peroxide

Example 3A: Digestion Experiment at 1:1.5 Ratio of Co to Oxalate in the Presence of Hydrogen Peroxide In a 1000 ml Ace glass reactor flask were charged 6 g $LiCoO_2$ (Sigma Aldrich, Catalog Number 442704, CAS Number [12190-79-3]), 11.59 g $H_2C_2O_4 \cdot 2H_2O$ (Sigma Aldrich reagent grade oxalic acid dihydrate, Catalog Number 247537, CAS Number [6153-56-6]), 1.04 g $H_2O_2$ (Sigma Aldrich 30% (w/w) in $H_2O$), Catalog Number H1009, CAS Number [7722-84-1]) and 799.12 g deionized water. The Co to oxalate ratio of this mixture was 1:1.5 and the concentration of oxalate in aqueous solution was 0.115 M. The Co to hydrogen peroxide ratio was 1:0.5. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 8.7 g. PXRD of solids recovered indicated it to be a mixture of cobalt oxalate dihydrate and lithium cobalt oxide

Example 3B: Digestion Experiment at 1:1.5 Ratio of Co to Oxalate in the Presence of Hydrogen Peroxide In a 1000 ml Ace glass reactor flask were charged 6 g $LiCoO_2$ (Sigma Aldrich, Catalog Number 442704, CAS Number [12190-79-3]), 11.59 g $H_2C_2O_4 \cdot 2H_2O$ (Sigma Aldrich reagent grade oxalic acid dihydrate, Catalog Number 247537, CAS Number [6153-56-6]), 20.85 g $H_2O_2$ (Sigma Aldrich 30% (w/w) in $H_2O$), Catalog Number H1009, CAS Number [7722-84-1]) and 780.26 g deionized water. The Co to oxalate ratio of this mixture was 1:1.5 and the concentration of oxalate in aqueous solution was 0.115 M. The Co to hydrogen peroxide ratio was 1:3. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 10.97 g. PXRD of solids matches exactly to commercial cobalt oxalate dihydrate (Sigma Aldrich, Catalog Number 401285, CAS Number [5965-38-8]).

Example 3C: Digestion Experiment at 1:1.5 Ratio of Co to Oxalate in the Presence of Hydrogen Peroxide In a 1000 ml Ace glass reactor flask were charged 6 g $LiCoO_2$ (Sigma Aldrich, Catalog Number 442704, CAS Number [12190-79-3]), 11.59 g $H_2C_2O_4 \cdot 2H_2O$ (Sigma Aldrich reagent grade oxalic acid dihydrate, Catalog Number 247537, CAS Number [6153-56-6]), 20.85 g $H_2O_2$ (Sigma Aldrich 30% (w/w) in $H_2O$), Catalog Number H1009, CAS Number [7722-84-1]) and 400.03 g deionized water. The Co to oxalate ratio of this mixture was 1:1.5 and the concentration of oxalate in aqueous solution was 0.23 M. The Co to hydrogen peroxide ratio was 1:3. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 9.82 g. PXRD of solids matches exactly to commercial cobalt oxalate dihydrate (Sigma Aldrich, Catalog Number 401285, CAS Number [5965-38-8]).

Example 3D: Digestion Experiment at 1:1.5 Ratio of Co to Oxalate in the Presence of Hydrogen Peroxide In a 1000 ml Ace glass reactor flask were charged 6 g $LiCoO_2$ (Sigma Aldrich, Catalog Number 442704, CAS Number [12190-79-3]), 11.59 g $H_2C_2O_4 \cdot 2H_2O$ (Sigma Aldrich reagent grade oxalic acid dihydrate, Catalog Number 247537, CAS Number [6153-56-6]), 31.67 g $H_2O_2$ (Sigma Aldrich 30% (w/w) in $H_2O$), Catalog Number H1009, CAS Number [7722-84-1]) and 400.53 g deionized water. The Co to oxalate ratio of this mixture was 1:1.5 and the concentration of oxalate in aqueous solution was 0.23 M. The Co to hydrogen peroxide ratio was 1:4.55. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 10.60 g. PXRD of solids matches exactly to commercial cobalt oxalate dihydrate (Sigma Aldrich, Catalog Number 401285, CAS Number [5965-38-8]).

Digestion Experiment of Bauxite Using Oxalic Acid and Recovery of Iron from Filtrate

Example 4A: Digestion Experiment of Bauxite Using Oxalic Acid

In a 1000 ml Ace Glass Reactor Flask were Charged 6 g NIST Standard SRM 600 Bauxite, 37.82 g $H_2C_2O_4 \cdot 2H_2O$ (Sigma Aldrich reagent grade oxalic acid dihydrate, Catalog Number 247537, CAS Number [6153-56-6]) and 401.32 g deionized water. The concentration of oxalate in aqueous solution was 0.75 M. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 2.06 g. PXRD of solids matches exactly to $FeC_2O_4 \cdot 2H_2O$.

Example 4B: Digestion Experiment of Bauxite Using Oxalic Acid

In a 1000 ml Ace glass reactor flask were charged 6 g NIST standard SRM 600 Bauxite, 100.86 g $H_2C_2O_4 \cdot 2H_2O$ (Sigma Aldrich reagent grade oxalic acid dihydrate, Catalog Number 247537, CAS Number [6153-56-6]) and 400 g deionized water. The concentration of oxalate in aqueous solution was 2 M. The flask was connected to a Duran® style head with a stirring rod and temperature controllers enclosed in a heating jacket. The reactor was stirred at 600 rpm and heated from 20° C. to 98° C. and held at the temperature for 7 h. After 7 h, immediately reactor was disassembled, and filtration was performed using an 11 μm cellulose filter. During filtration, residue was washed with deionized water. Later, residue was kept for drying overnight and obtained a total mass of 4.65 g. PXRD of solids matches exactly to $FeC_2O_4 \cdot 2H_2O$ and minor impurities of crashed out $H_2C_2O_4 \cdot 2H_2O$.

Example 4C: Recovery of Fe from the Filtrate Collected from Example 4A Using KOH In a 50 ml beaker, 25 ml of the light green filtrate from Example 4A was taken which had a pH of 0.62. In this filtrate, after adding 1.80 g of KOH (Alfa Aesar, Catalog Number A18854, CAS Number [1310-58-3]) pH increased to 7.94 and orange precipitate was observed. After adding, another 0.35 g of KOH, pH increased to 9.72 and dark orange precipitate with a clear solution was observed. On filtering the precipitate, 0.65 g solids were recovered. The residue was washed with deionized water and using PXRD it was confirmed to be ferric hydroxide.

Example 4D: Recovery of Fe from the Filtrate Collected from Example 4A Using Fe Powder In a 50 ml beaker, 25 ml of the light green filtrate from Example 4A was taken which had a pH of 0.62 and total mass of ferric ions as 0.76 g. In this filtrate, 0.1 g of iron metal powder (Alfa Aesar, Catalog Number S25370, CAS Number [7439-89-6]) was added. This beaker was sealed with a parafilm and kept on a magnetic stirring and heating plate for 8 h at 50° C. After 8 h, yellow precipitate was observed in the solution and on filtration 0.03 g of residue was obtained. The residue was washed with deionized water and was confirmed as ferrous oxalate dihydrate ($FeC_2O_4 \cdot 2H_2O$) using PXRD.

Recovery of Li from the Solution of Lithium Oxalate

Example 5A: Recovery of Li from the Solution of Lithium Oxalate Using Sodium Carbonate In a 25 ml conical flask, 0.41 g of $Li_2C_2O_4$ (Alfa Aesar, Catalog Number 013426, CAS Number [553-91-3]), 1.28 g of $Na_2CO_3$ (Alfa Aesar, Catalog Number 011552, CAS Number [497-19-8]) and 10 g of deionized water was added. The carbonate to oxalate ratio of this mixture was 3.0. The flask was kept on a magnetic stir plate and white precipitate was observed within first 10 minutes of stirring. After 1 h, filtration was performed, and 0.37 g of solid precipitate was recovered. PXRD of the solid recovered showed it to be a mixture of $Li_2CO_3$ and $Na_2C_2O_4$.

Example 5B: Recovery of Li from the Solution of Lithium Oxalate Using Ammonium Carbonate In a 15 ml Ace glass pressure vessel, 0.275 g of $Li_2C_2O_4$ (Alfa Aesar, Catalog Number 013426, CAS Number [553-91-3]), 0.26 g of $(NH_4)_2CO_3$ (Acros Organics, Catalog Number AC196650010, CAS Number [506-87-6]) and 5 g of deionized water was added. The carbonate to oxalate ratio of this mixture was 1.0. The vessel was kept on a magnetic stir plate and ammonia gas was bubbled for 15 minutes to increase the pH to 11.13. As the pH of solution increases, white precipitate starts forming in the vessel. After 1 h of stirring, filtration was performed, and 0.14 g of solid precipitate was recovered. PXRD of the solid recovered showed it to be a mixture of $Li_2CO_3$ and $(NH_4)_2C_2O_4$.

Example 5C: Recovery of Li from the Solution of Lithium Oxalate Using Sodium Phosphate In a 10 ml volumetric flask, 0.25 g of $Li_2C_2O_4$ (Alfa Aesar, Catalog Number 013426, CAS Number [553-91-3]) and 5 g of deionized water was added. In another 10 ml volumetric flask, 0.53 g of $Na_3PO_4$ (Alfa Aesar, Catalog Number 011552, CAS Number P97-19-81) and 5 g of deionized water was added. Both of the volumetric flasks were kept on a magnetic stir plate for 15 minutes and within 5 minutes both solutions turned completely clear. Now, in a 25 ml conical flask both of the solutions were mixed and kept on a magnetic stir plate for 1 h. The phosphate to oxalate ratio of this mixture was 2.0. Within 5 minutes of stirring, a white precipitate was observed. After 1 h of stirring, filtration was performed, and 0.22 g of solid precipitate was recovered. PXRD of the solid recovered showed it to be $Li_3PO_4$.

Example 5D: Recovery of Li from the Solution of Lithium Oxalate Using Ammonium Carbonate In a 25 ml conical flask, 1.30 g of $Li_2C_2O_4$ (Alfa Aesar, Catalog Number 013426, CAS Number [553-91-3]), 1.67 g of $(NH_4)_2CO_3$ (Acros Organics, Catalog Number AC196650010, CAS Number [506-87-6]) and 25 g of deionized water was added. The vessel was kept on a magnetic stir plate and pH was measured to be 8.51. In order to increase the pH, 0.12 g NaOH (Alfa Aesar, Catalog Number A16037, CAS Number [1310-73-2]) was added in the conical flask and pH increased to 12.53. As the pH of solution increases, white precipitate starts forming in the vessel. After 1 h of stirring, filtration was performed, and 0.20 g of solid precipitate was recovered. PXRD of the solid recovered showed it to be a mixture of $Li_2CO_3$ and $(NH_4)_2C_2O_4 \cdot H_2O$.

Example 5E: Recovery of Li from the Solution of Lithium Oxalate Using Dipotassium Phosphate In a 25 ml conical flask, 1.30 g of $Li_2C_2O_4$ (Alfa Aesar, Catalog Number 013426, CAS Number [553-91-3]), 2.67 g of $K_2HPO_4$ (Alfa Aesar, Catalog Number 011593, CAS Number [7758-11-4]) and 25 g of deionized water was added. The vessel was kept on a magnetic stir plate and pH was measured to be 6.62. In order to increase the pH, 1.04 g KOH (Alfa Aesar, Catalog Number A18854, CAS Number [1310-58-3]) was added in the conical flask and pH increased to 12.82. As the pH of solution increases, white precipitate starts forming in the vessel. After 1 h of stirring, filtration was performed, and 1.72 g of solid precipitate was recovered. PXRD of the solid recovered showed it to be $Li_3PO_4$.

Example 5F: Recovery of Li from the Filtrate Collected from Example 2E Using Dipotassium Phosphate In a 250 ml beaker, 200 g of the filtrate was added and kept on a heating plate at 110° C. until 50 g of filtrate is left. In the concentrated filtrate, 3.61 g of $K_2HPO_4$ (Alfa Aesar, Catalog Number 011593, CAS Number [7758-11-4]) was added. The vessel was kept on a magnetic stir plate and pH was measured to be 2.2. In order to increase the pH, 8.07 g KOH (Alfa Aesar, Catalog Number A18854, CAS Number [1310-58-3]) was added in the beaker and pH increased to 13.41. As the pH of solution increases, precipitate starts forming in the vessel. After 1 h of stirring, filtration was performed, and 1.62 g of solid precipitate was recovered. PXRD of the solid recovered showed it to be a mixture of majorly $Li_3PO_4$, with minor impurities of $Co_3PO_4$.

Example 5G: Recovery of Li from the Solution of Lithium Oxalate Using Potassium Carbonate In a 25 ml conical flask, 1.30 g of $Li_2C_2O_4$ (Alfa Aesar, Catalog Number 013426, CAS Number [553-91-3]), 2.11 g of $K_2CO_3$ (Alfa Aesar, Catalog Number A16625, CAS Number [584-08-7]) and 25 g of deionized water was added. The vessel was kept on a magnetic stir plate and pH was measured to be 11.60. In order to increase the pH above 12, 0.06 g KOH (Alfa Aesar, Catalog Number A18854, CAS Number [1310-58-3]) was added in the conical flask and pH increased to 12.32. As the pH of solution increases, white precipitate starts forming in the vessel. After 1 h of stirring, filtration was performed, and 0.97 g of solid precipitate was recovered. PXRD of the solid recovered showed it to be a mixture of $Li_2CO_3$ and $K_2C_2O_4$.

Exchange of Potassium Ions with Hydrogen Ions Using Ion Exchange Resins

Example 6A: Activation of Amberlyst®-15 Resins

In a 250 ml beaker, 200 ml of 1 M sulfuric acid (Fisher Scientific, Catalog Number A300500, CAS Number [7664-93-9]) along with 50 g of dry Amberlyst®-15 resins (Sigma Aldrich, Catalog Number 216380, CAS Number [39389-20-3] were added. The resins were soaked in acidic solution for 24 h. After 24 h, resins were separated from the acid and washed with deionized water until the effluent water becomes pH neutral.

Example 6B: Exchange of $K^+$ from the Solution of Potassium Oxalate Using Amberlyst®-15

In a 250 ml beaker, 3.02 g KOH (Alfa Aesar, Catalog Number A18854, CAS Number [1310-58-3]), 3.37 g $H_2C_2O_4 \cdot 2H_2O$ (Sigma Aldrich reagent grade oxalic acid dihydrate, Catalog Number 247537, CAS Number [6153-56-6]) and 100 g deionized water was added. The concentration of potassium ions in this solution was 19700 ppm. In this solution, 12 g of activated Amberlyst®-15 was added and solution was left still for 24 h. After 24 h, the concentration of potassium ions in the solution was found to be 5300 ppm.

Example 6C: Exchange of $K^+$ from the Solution of Potassium Oxalate Using Amberlyst®-15

In a 250 ml beaker, solution from Experiment 6B after separating the used resins was transferred. The concentration of potassium ions in this solution was 5300 ppm. In this solution, 8.24 g of activated Amberlyst®-15 was added and solution was left still for 24 h. After 24 h, the concentration of potassium ions in the solution was found to be 1134 ppm. The resins were separated from the solution, and another 8 g of activated resins were added. The solution was left still for 24 h. After 24 h, the concentration of potassium ions in the solution was found to be 203 ppm.

Example 6D: Exchange of $K^+$ from the Solution of Potassium Oxalate Using Amberlyst®-15

In a 250 ml beaker, 3.02 g KOH (Alfa Aesar, Catalog Number A18854, CAS Number [1310-58-3]), 3.37 g $H_2C_2O_4 \cdot 2H_2O$ (Sigma Aldrich reagent grade oxalic acid dihydrate, Catalog Number 247537, CAS Number [6153-56-6]) and 100 g deionized water was added. The concentration of potassium ions in this solution was 19300 ppm and resulting pH was 4.12. In this solution, 24.80 g of activated Amberlyst®-15 was added and samples for pH and potassium ion measurements were withdrawn every 1 h. After 3 h, pH of the solution was stabilized at 1.19 and potassium ion concentration was found to be 830 ppm.

Example 6E: Exchange of $K^+$ from the Filtrate of Example 5F Using Amberlyst®-15

In a 50 ml beaker, 30.85 g of filtrate from Example 5F was mixed with 30 g of activated Amberlys®-15 resins. The concentration of potassium ions in the filtrate before mixing it with resins was 132399 ppm which is equivalent to 4.08 g of potassium ions in 50 g of solution and. pH of this solution was 13.24. After mixing the resins, solution was left still for 12 h. After 12 h, pH dropped to 4.30 and the mass of potassium ions left in the solution was found to be 2.22 g. The resins were separated from the solution and another fresh batch of 20 g activated resins was added. After the addition, the solution was left still for 12 h. After 12 h, pH dropped to 3.15 and the mass of potassium ions left in the solution was found to be 0.72 g. In this two-step experiment around 83% of potassium ions were exchanged with hydrogen ions.

Example 6F: Exchange of $K^+$ from the Solution of Potassium Hydroxide Using Amberlys®-15

In a 100 ml beaker, 1.52 g KOH (Alfa Aesar, Catalog Number A18854, CAS Number [1310-58-3]) and 50 g deionized water was added. The concentration of potassium ions in this solution was 18408 ppm and resulting pH was 13.57. In this solution, 9.42 g (dry weight) of activated Amberlys®-15 resin was added. The solution was left still and samples for pH and potassium ion concentration measurements were withdrawn over next 1 h. After 30 minutes, pH of the solution was stabilized at 12.90 and potassium ion concentration was found to be 5074 ppm.

Example 6G: Exchange of $K^+$ from the Solution of Potassium Hydroxide Using Amberlyst®-15

In a 100 ml beaker, 1.49 g KOH (Alfa Aesar, Catalog Number A18854, CAS Number [1310-58-3]) and 50 g deionized water was added. The concentration of potassium ions in this solution was 17816 ppm and resulting pH was 13.47. In this solution, 8.51 g (dry weight) of activated Amberlys®-15 resin was added. The solution was kept on a shaker table at 145 rpm and samples for pH and potassium ion concentration measurements were withdrawn over next 1 h. After 30 minutes, pH of the solution was stabilized at 12.82 and potassium ion concentration was found to be 4987 ppm.

Example 6H: Exchange of $K^+$ from the Solution of Potassium Hydroxide Using Resins from Example 6F In a 100 ml beaker, 50 ml of 1 M sulfuric acid (Fisher Scientific, Catalog Number A300500, CAS Number [7664-93-9]) and the resins used in Example 6F were mixed. The mixture was left still for 24 h. After 24 h, the resins were separated from the acid solution and were washed with deionized water. The washing was done till the effluent becomes pH neutral. Now, these resins were used to exactly repeat Example 6F. The starting potassium hydroxide solution had a pH of 13.57 with total potassium concentration as 18444 ppm. After the resins were mixed with the KOH solution, it was kept still for one hour and samples for pH and potassium ion concentration measurements were withdrawn at regular intervals. After 30 minutes, pH of the solution stabilized around 13.14 and concentration of potassium ion in the solution was 7456 ppm.

Example 6I: Exchange of $K^+$ from the Solution of Potassium Hydroxide Using Resins from Example 6G In a 100 ml beaker, 50 ml of 1 M sulfuric acid (Fisher Scientific, Catalog Number A300500, CAS Number [7664-93-9]) and the resins used in Example 6G were mixed. The mixture was kept on a shaker table at 145 rpm for 2 h. After 2 h, the resins were separated from the acid solution and were washed with deionized water. The washing was done till the effluent becomes pH neutral. Now, these resins were used to exactly repeat Example 6G. The starting potassium hydroxide solution had a pH of 13.57 with total potassium concentration as 18444 ppm. After the resins were mixed with the KOH solution, it was kept on a shaker table at 145 rpm for one hour and samples for pH and potassium ion concentration measurements were withdrawn at regular intervals. After 30 minutes, pH of the solution stabilized around 13.10 and concentration of potassium ion in the solution was 7074 ppm.

Exchange of Ammonium Ions with Hydrogen Ions Using Ion Exchange Resins

Example 7A: Exchange of $NH_4^+$ from the Solution of Diammonium Oxalate Using Amberlys®-15

In a 100 ml beaker, 2.0 g $(NH_4)_2C_2O_4 \cdot H_2O$ (Acros Organics ammonium oxalate monohydrate, Catalog Number AC206270010, CAS Number [6009-70-7]) and 50 g deionized water was added. The mixture was kept on a magnetic stir plate for 15 minutes. After 15 minutes, solution was completely clear and resulting pH of the solution was 5.70. In this solution, 15.20 g of activated Amberlyst®-15 resin was added and samples for pH measurements were withdrawn for next 1.5 h. Within first 40 minutes, pH of the solution was stabilized around 2.60. The resins were separated from the solution and 1 ml of solution was dried on a micro slide for 12 h to form crystals. These crystals were ground in a pestle and mortar to form a fine powder for running PXRD. These ground crystals were confirmed to be ammonium hydrogen oxalate hemihydrate $(NH_4HC_2O_4 \cdot 0.5H_2O)$ using PXRD Example 7B: Exchange of $NH_4^+$ from the Solution of Example 7A Using Amberlys®-15

In a 100 ml beaker, entire solution from Example 7A after separating the resins was transferred. In this solution, 16.0 g of activated Amberlyst®-15 resin was added and samples for pH measurements were withdrawn for next 1.5 h. Within 30 minutes of stirring, pH of the solution was stabilized around 1.10. The resins were separated from the solution and 1 ml of solution was dried on a micro slide for 12 h to form crystals. These crystals were ground in a pestle and mortar to form a fine powder for running PXRD. These ground crystals were confirmed to be ammonium hydrogen oxalate hemihydrate $(NH_4-HC_2O_4 \cdot 0.5H_2O)$ and oxalic acid dihydrate $(H_2C_2O_4 \cdot 2H_2O)$ using PXRD Example 7C: Exchange of $NH_4^+$ from the Solution of Diammonium Oxalate Using the Resins from Example 7A In a 100 ml beaker, 50 ml of 1 M sulfuric acid (Fisher Scientific, Catalog Number A300500, CAS Number [7664-93-9]) and the resins used in Example 7A were mixed. The mixture was left still for 24 h. After 24 h, the resins were separated from the acid solution and were washed with deionized water. The washing was done till the effluent becomes pH neutral. Now, these resins were used to exactly repeat Example 7A and final pH of the solution was found to be 2.68. On running PXRD on the ground crystals formed from 1 ml of the solution, solids were confirmed to be ammonium hydrogen oxalate hemihydrate ($NH_4$—$HC_2O_4 \cdot 0.5H_2O$)

Example 7D: Exchange of $NH_4^+$ from the Solution of Diammonium Oxalate Using Amberlys®-15

Example 7A was exactly repeated with the activated resins weighing around 7.63 g (dry weight) on a shaker table at 145 rpm. The final pH of the solution after the ion exchange treatment was around 2.65. PXRD was ran in a similar way like previous examples and solids were confirmed to be ammonium hydrogen oxalate hemihydrate ($NH_4$—$HC_2O_4 \cdot 0.5H_2O$)

Example 7E: Exchange of $NH_4^+$ from the Solution of Diammonium Oxalate Using the Resins from Example 7A In a 100 ml beaker, 50 ml of 1 M sulfuric acid (Fisher Scientific, Catalog Number A300500, CAS Number [7664-93-9]) and the resins used in Example 7D were mixed. The mixture was shaken on a shaker table at 145 rpm for 2 h. After 2 h, the resins were separated from the acid solution and were washed with deionized water. The washing was done till the effluent becomes pH neutral. Now, these resins were used to exactly repeat Example 7A and final pH of the solution was found to be 2.78. On running PXRD on the ground crystals formed from 1 ml of the solution, solids were confirmed to be ammonium hydrogen oxalate hemihydrate ($NH_4HC_2O_4 \cdot 0.5H_2O$)

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the invention to enable one skilled in the art to utilize the invention in various embodiments and with various modifications as suited to the particular use contemplated. It is intended that the scope of the disclosure be defined by the claims appended hereto and their equivalents.

What is claimed is:

1. A method for recovering metals from an electrode material, method comprising:
    (a) exposing an electrode material comprising Co and Li, to a leaching solution comprising ammonium hydrogen oxalate, wherein the leaching solution is substantially free of oxalic acid, to provide a solid composed of cobalt oxalate and a solution of lithium oxalate;
    (b) processing the solid to recover cobalt;
    (c) processing the solution to provide a lithium precipitate and a filtrate comprising an oxalate;
    (d) processing the filtrate comprising the oxalate to recover ammonium hydrogen oxalate; and
    (e) repeating step (a) with the recovered ammonium hydrogen oxalate.

2. The method of claim 1, wherein the leaching solution consists of water, the ammonium hydrogen oxalate, and optionally, a reducing agent or an oxidizing agent.

3. The method of claim 1, wherein the filtrate comprises potassium oxalate and step (d) comprises exposing the filtrate to an ion exchange resin to exchange potassium ions for hydrogen ions.

4. The method of claim 1, wherein the filtrate comprises diammonium oxalate and step (d) comprises exposing the filtrate to an ion exchange resin to exchange ammonium ions for hydrogen ions to provide recovered ammonium hydrogen oxalate; and step (d) further comprises exposing the ion exchange resin to sulfuric acid to provide a solution of diammonium sulfate; and subjecting the solution of diammonium sulfate to crystallization and deammoniation to provide recovered ammonia.

5. The method of claim 1, wherein step (b) recovers the cobalt as a cobalt oxide product.

6. The method of claim 5, wherein the leaching solution further comprises hydrogen peroxide.

7. The method of claim 5, wherein step (c) comprises adding a salt to the solution of lithium oxalate to induce the precipitation.

8. The method of claim 7, wherein the salt is a potassium salt.

9. The method of claim 5, wherein the leaching solution consists of water, the ammonium hydrogen oxalate, and optionally, a reducing agent or an oxidizing agent.

10. The method of claim 5, wherein the filtrate comprises potassium oxalate and step (d) comprises exposing the filtrate to an ion exchange resin to exchange potassium ions for hydrogen ions.

11. The method of claim 5, wherein the filtrate comprises diammonium oxalate; step (d) comprises exposing the filtrate to an ion exchange resin to exchange ammonium ions for hydrogen ions to provide recovered ammonium hydrogen oxalate; and step (d) further comprises exposing the ion exchange resin to sulfuric acid to provide a solution of diammonium sulfate; and subjecting the solution of diammonium sulfate to crystallization and deammoniation to provide recovered ammonia.

12. The method of claim 1, wherein the processing of the solid in step (b) comprises exposing the solid to a base to induce hydrolysis of the solid to recover the cobalt and to provide a second filtrate.

13. The method of claim 12, wherein the base is provided by the filtrate comprising the oxalate from step (c).

14. The method of claim 1, wherein step (a) is carried out under inert conditions.

15. The method of claim 14, wherein the leaching solution consists of water and the ammonium hydrogen oxalate.

16. The method of claim 1, wherein step (a) is carried out under reductive conditions.

17. The method of claim 16, wherein the leaching solution consists of water, the ammonium hydrogen oxalate, and a reducing agent.

* * * * *